Sept. 16, 1969  R. W. KRAMER  3,467,200
LEVELING LINKAGE FOR HARROWS

Filed Jan. 11, 1966  3 Sheets-Sheet 3

INVENTOR.
RICHARD W. KRAMER
BY
Tweedale & Gerhardt
ATTORNEYS.

United States Patent Office 3,467,200
Patented Sept. 16, 1969

3,467,200
LEVELING LINKAGE FOR HARROWS
Richard W. Kramer, Fowler, Calif., assignor to Massey-Ferguson Inc., Detroit, Mich.
Filed Jan. 11, 1966, Ser. No. 519,903
Int. Cl. A01b 21/08
U.S. Cl. 172—584          8 Claims

ABSTRACT OF THE DISCLOSURE

An offset disc harrow has dual section hinged front and rear gangs with the inner sections of the gangs pivotally connected and force transmitting leveling linkage extending from the outer front section to the outer rear section through a lever pivoted on one of the inner sections, a separate angle setting and limiting linkage connects the front and rear gang, adjustments are provided for leveling. The leveling linkage balances the tendency of the front outer section to dig into the soil and the opposite tendency of the rear outer section to rise above the ground. The forces acting on the inner sections are balanced through the hinge.

---

This invention relates to offset disc harrows and more specifically to a force transmitting system for counter balancing the forces which cause uneven penetration of the outer ends of a flexible offset disc harrow.

In order to cover large soil areas in harrowing operations the disc gangs of offset disc harrows have been constructed of considerable length. This development led to the need for articulating the gangs rather than using rigid lengths of disc gangs. It has been observed that during operation of an offset disc harrow the soil working forces cause the free end portion of the front disc gang to dig too deeply into the soil and the free end portion of the rear disc gang to dig too shallowly or even to rise above the soil, because of the couple between the lateral soil force applied near the bottoms of the disc blades and the reactive force at the gang connection.

Accordingly, the invention consists of a force transmitting structure interconnecting the front and rear gangs of a flexible offset disc harrow in such a manner that the structure is adapted to transmit the lifting force caused by the soil working force on one gang portion to the other portion where lifting is needed to level it. Conversely, the force which causes one of the gang portions to dig into the ground too deeply is transmitted to the other gang portion which is trying to lift. The force transmitting structure interconnects the gangs such that the free end portions of both gangs generally move together and are not affected by the draft force acting between the front and rear gangs.

In order that the invention may be more clearly understood a preferred embodiment will now be described with reference to the accompanying drawings in which.

Figure 1:
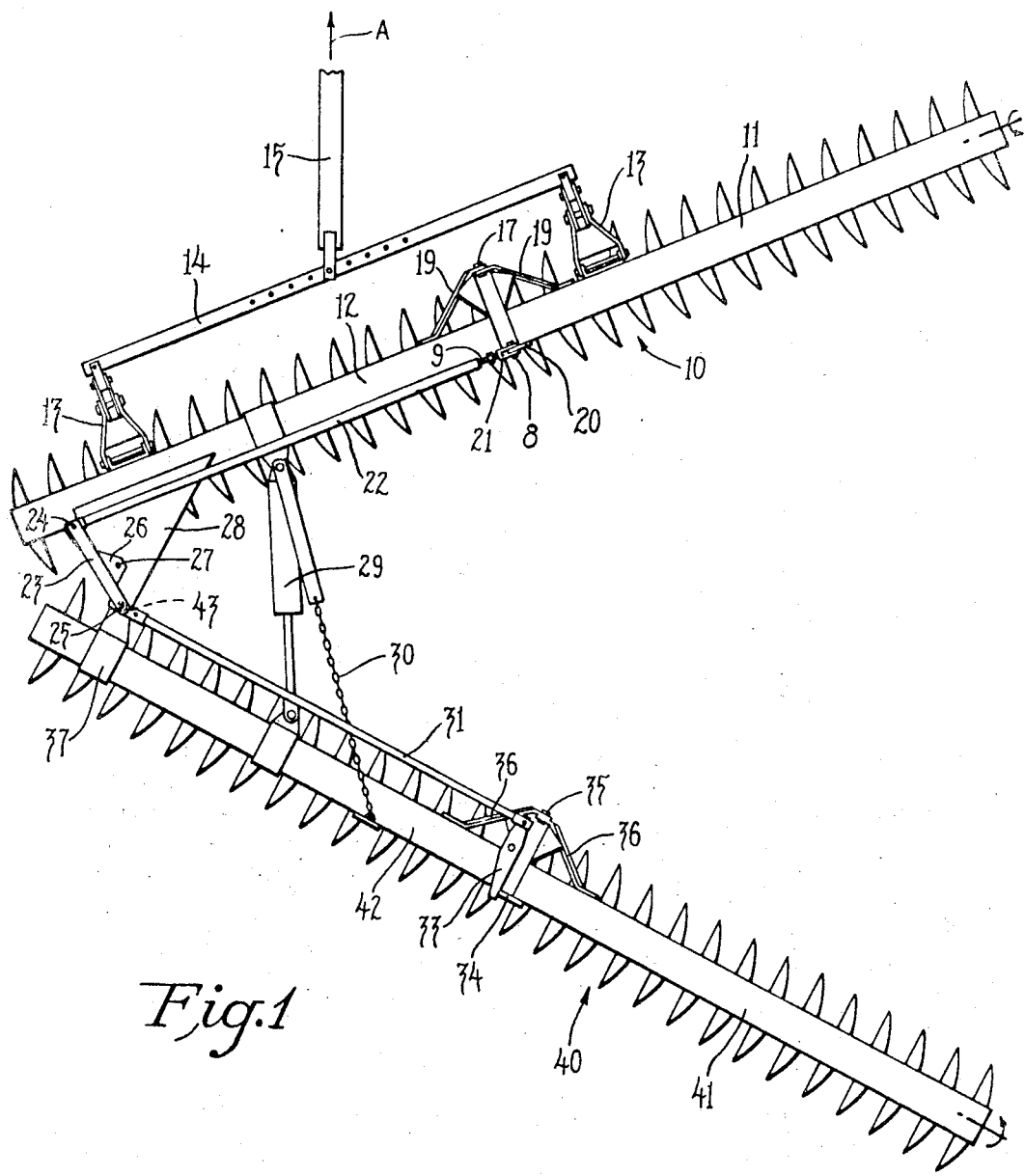
FIG. 1 is a plan view of a flexible offset disc harrow including the invention.

In FIG. 1 a flexible offset disc harrow is shown which is pulled by a tractor or the like in the direction indicated by the arrow A. The harrow comprises two offset disc gangs 10 and 40 of considerable length which are pivotally interconnected at a hinge pivot 43. The pivot 43 which links the front and rear disc gangs of the harrow is on one of the inner gang portions or on a bracket 28 extending therefrom, which bracket is mounted on the disc gang 10 and a projection 37 which is mounted on the disc gang 40. Just as the bracket 28, the projection 37 can be omitted and the gangs can be linked directly. Gang 10 consists of an inner portion 12 and an outer portion 11. Gang 40 consists of an inner portion 42 and an outer portion 41. Both outer portions are pivotally connected for vertical movement relative to their inner portions at pivot axes 17 and 35, respectively.

A preferably hydraulic opening device or ram 29 of conventional structure is used to set the angular opening between the gangs 10 and 40 prior to operating the harrow. The gang angle is controlled by a holding means, for example a chain stop 30. The use of a holding device like a chain stop fixes the set gang angle and does not allow the draft force to affect the force transmitting structure between the gangs.

Two hitch frame elements 13 project from the front gang 10 and are interconnected by a beam 14 to which a draw bar 15 is attached.

Figure 2:
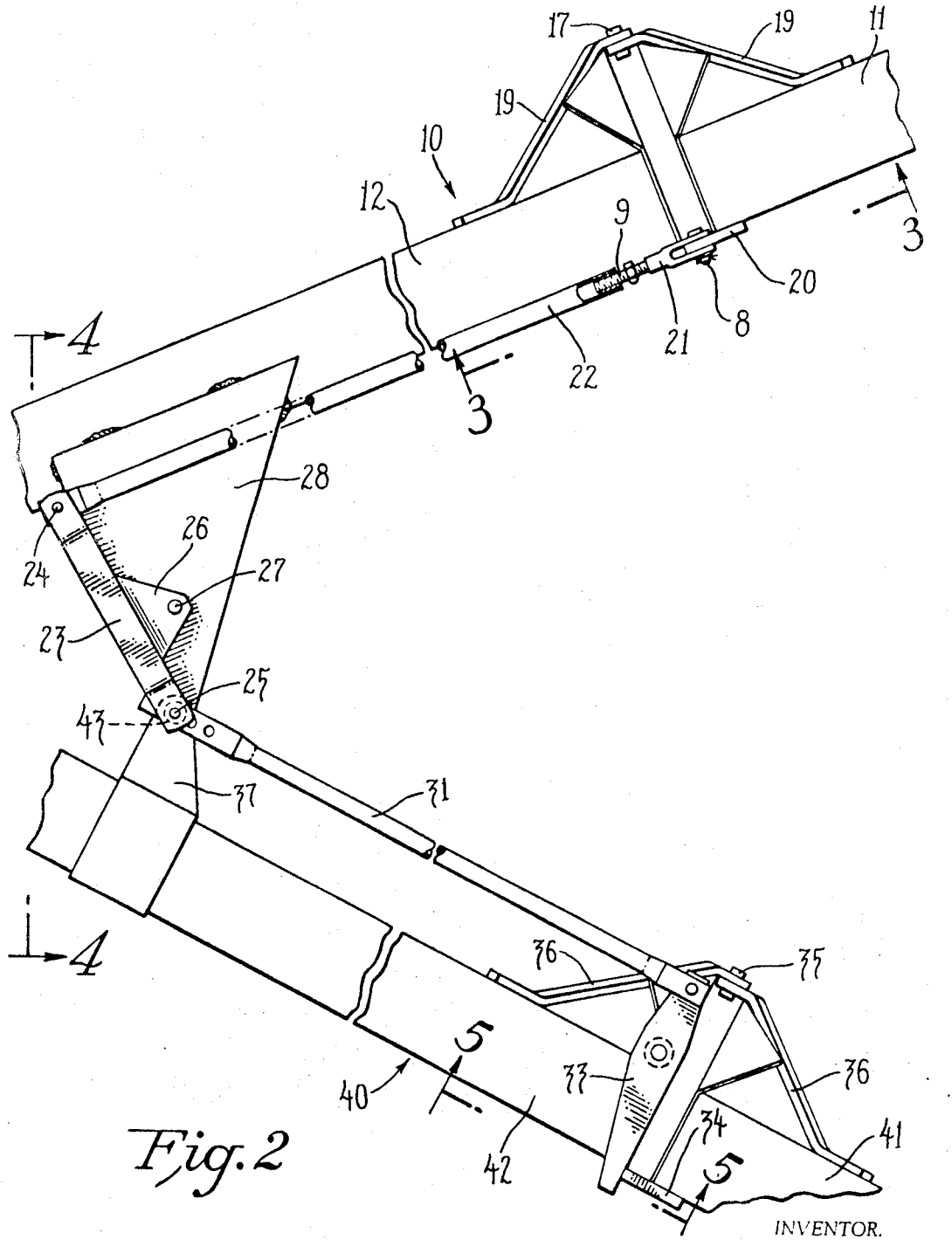
FIG. 2 is a plan view of one side of the harrow and the force transmitting structure with portions of the disc gangs broken away.

As shown basically in FIG. 1 and more clearly in FIG. 2 a preferred embodiment of the force transmitting structure according to the invention interconnects the free end portion 11 of the front gang 10 with the free end portion 41 of the rear gang 40.

Figure 3:
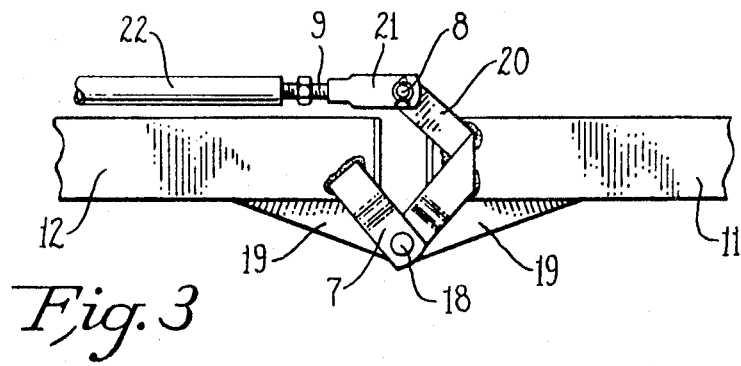
FIG. 3 is a view taken along the line 3—3 of FIG. 2.

FIG. 3 illustrates the front force transmitting and receiving linkage at the front disc gang 10. It comprises a downwardly directed bracket 7 which extends from the gang portion 12 and an upwardly and downwardly directed bracket 20 which extends from the adjoining end of the gang portion 11. The brackets are joined at pivot 18 (FIG. 3) for vertical movement of the outer gang portion 11. A threaded sleeve 21 is pivoted to the upwardly directed portion of the bracket 20 by a pivot pin 8. The sleeve 21 which extends from the pivot 8 preferably carries an adjustable screw member 9 which is held in a screw-threaded end portion of a front link 22. The level of operation can be controlled by adjusting the screw member 9.

The front link 22 leads to a lever 23 having a projection 26. The lever 23 is fulcrumed on the bracket 28 at pivot 27 through the projection 26. There is a pivot 24 between the front link 22 and the lever 23 and a pivot 25 between the lever 23 and a rear link 31. The rear link 31 is arranged parallel to the inner portion 42 of the rear disc gang 40. The end of the rear link 31 which is pivoted to one end of the lever 23 has a plurality of extra apertures which allow adjustment of the lateral position of the rear gang.

Figure 4:
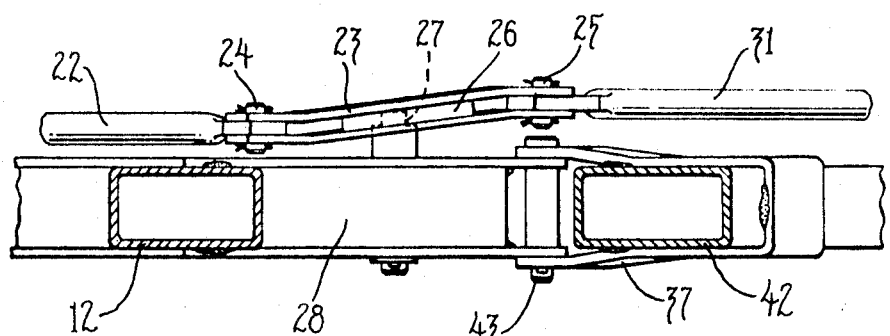
FIG. 4 is a view taken along the line 4—4 of FIG. 2.

FIG. 4 shows how the force transmitting structure leads around the harrow hinge point 43 from one force transmitting and receiving linkage to the other one. This view makes clear that the linkage pivot 25 is above the hinge pivot 43 and separate therefrom. This juxtaposition between the linkage pivot 25 and the hinge pivot 43 is preferred in that it causes the leveling action to be relatively unaffected by changes in the gang angle, and allows the collapsing of the harrow for transport without the need to prepare the force transmitting structure in any way for such collapsing. FIG. 4 also shows the main pivot axis 27 of the force transmitting structure in a side view.

Figure 5:
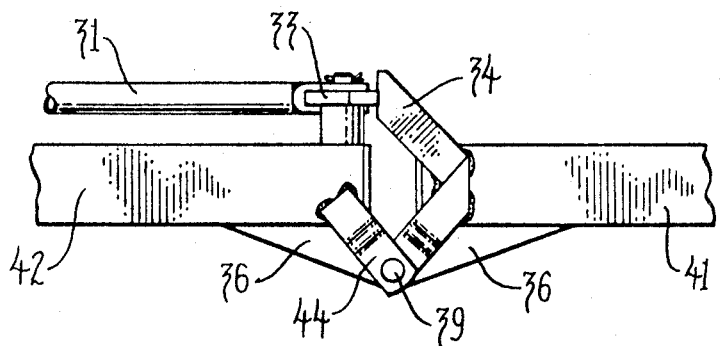
FIG. 5 is a view taken along the line 5—5 of FIG. 2.

As best illustrated in FIGS. 2 and 5, the rear link 31 leads to the rear force transmitting and receiving linkage which comprises a lever 33, pivotally carried on the outer end of the inner disc gang 42; a bracket 44, downwardly projecting from the same end; and a bracket 34, downwardly and upwardly projecting from the inner end of the outer gang portion 41. The downwardly directed portion of the bracket 34 is pivotally linked at pivot 39 with the bracket 44, thereby allowing the gang portion 41 to move vertically relative to the gang portion 42. The upwardly directed portion of the bracket 34 forms a stop for engagement with the lever 33.

Struts 19 at the front gang 10 and struts 36 at the rear gang 40 serve for the desirable spacing of the front pivots 17 and 35, respectively, from the rear pivots 18 and 39.

During operation of the harrow with the discs arranged as shown in FIG. 1 the digging movement of the outer portion 11 of the disc gang 10 pulls via bracket 20 at the front link 22. This pulling force is transmitted via lever 23 and rear link 31 to the lever 33. This causes the free end of the lever 33 to engage the stop of the bracket 34 strongly, thereby pressing down the outer gang portion 41 which has a tendency to rise during operation of the harrow. Conversely, the force resulting from the rising of the outer portion 41 of the disc gang 40 pulls via lever 33 at the rear link 31 which in turn actuates the front link 22, via the lever 23, in such a manner that the outer portion 11 of the front disc gang 10 is being lifted.

In the operation of the described embodiment the outer portion 11 of the front disc gang 10 digs into the soil too deeply because the discs on the gang have their concave sides directed toward the open end of the offset disc harrow, whereas the outer portion 41 of the rear disc gang 40 rises because the discs on the gang have their convex sides directed toward the open end of the offset disc harrow.

The described preferred embodiment of the improved motion transmitting structure follows the gangs and is pivoted near the hinge pivot between the two gangs, thereby making the leveling action independent of the gang angle and allowing the collapsing of the harrow for transport without the need to prepare the motion transmitting structure in any way for such collapsing. It is, however, also possible to provide motion transmitting means which lead directly from one gang to the other one and which are flexible, for example hydraulic, or adjustable as to their length, thus making them adaptable to various angle settings between the front and rear disc gangs.

I claim:

1. In a flexible offset disc harrow comprising a front and a rear disc gang, each having inner and outer portions pivotally connected end to end for vertical movement with respect to each other and means connecting the ends of said inner portions opposite said outer portions, a force transmitting structure for interconnecting said front and rear gangs, said structure comprising a front force transmitting unit having a front link, said front link applying a moment to the outer front gang about its pivot axis adapted to hold up its outer end, a lever being pivoted on one of the inner gang portions and connected to said front link and a rear force transmitting unit having a link which applies a moment to the outer rear gang about its pivot axis and also connected to said lever, adapted to correspondingly hold down its outer end.

2. The combination of claim 1 further comprising an opening device intermediate said front and rear disc gangs for setting the angle between the gangs.

3. The combination of claim 2 further comprising a positive holding means intermediate said front and rear disc gangs for fixing the set angle between the gangs.

4. The combination of claim 3 wherein said positive holding means is a chain stop.

5. The combination of claim 1 wherein screw means are provided in said force transmitting structure to allow adjustment of the relative level of the outer gangs.

6. The combination of claim 1 wherein a plurality of pivot holes in side by side arrangement is provided in one member of said force transmitting structure to allow adjustment of the leverage for controlling the level.

7. The combination of claim 1 wherein one of the linkage pivots of said lever and the hinge pivot connecting the front and rear gangs are substantially superimposed.

8. The combination of claim 1 further comprising strut means at the pivot axes intermediate said inner and outer disc gang portions for outwardly extending said pivot axes.

References Cited

UNITED STATES PATENTS

| 2,604,746 | 7/1952 | Frank | 172—568 |
| 2,685,159 | 8/1954 | Brundage | 172—580 |

ANTONIO F. GUIDA, Primary Examiner

R. C. HARRINGTON, Assistant Examiner